(12) United States Patent
Zhao et al.

(10) Patent No.: US 7,855,560 B2
(45) Date of Patent: Dec. 21, 2010

(54) ANALOG FRONT-END COHERENT IN-PHASE DEMODULATION DATA ACQUISITION SYSTEM FOR RESISTIVITY IMAGE TOOLS

(75) Inventors: Jinsong Zhao, Houston, TX (US); Stanislav Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 229 days.

(21) Appl. No.: 12/165,264

(22) Filed: Jun. 30, 2008

(65) Prior Publication Data

US 2009/0322337 A1 Dec. 31, 2009

(51) Int. Cl.
*G01V 3/20* (2006.01)
*G01V 3/02* (2006.01)
*G01V 3/18* (2006.01)

(52) U.S. Cl. .................. 324/357; 324/367; 324/370

(58) Field of Classification Search .................. 324/347, 324/354–357, 360–363, 366–370, 373–375; 175/50
See application file for complete search history.

(56) References Cited

U.S. PATENT DOCUMENTS 6,975,121 B2 * 12/2005 Strack et al. ................. 324/347
7,579,841 B2 * 8/2009 San Martin et al. .......... 324/366

* cited by examiner

*Primary Examiner*—Bot L LeDynh
(74) *Attorney, Agent, or Firm*—Charles S. Knobloch; Gordon T. Arnold; Arnold & Knobloch, L.L.P.

(57) ABSTRACT

A method and system for measuring formation resisitivity is achieved by introducing an electrical signal into the formation. The current of the introduced electrical signal is then sensed, producing an analog voltage signal as a measurement of the formation. The introduced electrical signal is compared with the measured signal of the formation. The comparison is made in a quadrature demodulation device, producing an in-phase demodulated signal. A quasi-direct-current signal is extracted from the in-phase demodulated signal, producing an analog measurement related to the resistivity of the formation.

11 Claims, 3 Drawing Sheets

ANALOG FRONT-END COHERENT IN-PHASE DEMODULATION DATA ACQUISITION SYSTEM FOR RESISTIVITY IMAGE TOOLS

FIELD OF THE INVENTION

The present invention relates generally to hydrocarbon exploration and production, and more particularly relates to a logging method and system for determining earth formation resistivity.

BACKGROUND

Resistivity logging measures the electrical resistivity of formations surrounding an earth borehole. Resistivity logging is a commonly used technique of formation evaluation. For example, porous formations having high resistivity generally indicate the presence of hydrocarbons, while porous formations having low resistivity are generally water saturated. A logging device is lowered in the well bore on a wireline cable and measurements are taken with the device as the cable is withdrawn. One technique of resistivity logging uses electrodes. For example, button electrodes are used on a pad which is placed in close proximity to the borehole wall. A measured current flows in a circuit that connects a current source to one electrode, through the earth formation to a return electrode and back to the current source in the logging tool.

FIG. 1 illustrates one example of using electrical earth borehole logging for the determination of formation resistivity, $R_F$. In this example, an earth formation 100 is penetrated by a wellbore 200. Electrodes 10 and 12 are in wellbore 200, in proximity of earth formation 100. Electrode 10 is separated a distance from electrode 12. A standoff zone 20 exists between electrodes 10 and 12 and earth formation 100. Drilling fluids typically reside in wellbore 200, including within standoff zone 20. A current I, having a voltage V, is generated by a signal generator 1 and introduced into formation 100 through electrode 10. Electrode 12 is a ground return. Current I penetrates through standoff zone 20 into formation 100. Standoff zone 20 exhibits a standoff impedance $Z_C$ between electrodes 10 and 12, owing to the electrical characteristics of the drilling fluids. For example, Oil Based Mud (OBM) has a high resistance, causing a capacitive dielectric effect between electrodes 10 and 12. A current sensor 2 detects the current at electrode 10, producing voltage signal $V_I$. A comparison is made of the voltage V from signal generator 1 and the detected current, as represented by voltage signal $V_I$. A measure of the formation resistivity, $R_F$ is determined from this comparison.

For Oil Based Mud (OBM), a high frequency driving source has to be used to excite the formation in order to measure the formation resistivity. The simplified impedance model of the Oil Based Mud (OBM) standoff and the formation is:

$$Z = Z_R + jZ_C \approx R_F + jZ_C(C_S, \omega) \quad (1)$$

Where Z is the total impedance expressed as a complex number, $Z_R$ is the real component of the total impedance, j is the square root of minus one, Zc is the impedance from the standoff, $R_F$ is formation resistance, $C_S$ is the capacitance of the standoff, and ω is the frequency in radians.

Given ω=2π·10 MHz as a nominal frequency value, the ratio of impedances for the Oil Based Mud (OBM) can range from 20 to 100 or higher, which is $$20 \le \frac{Z_C}{R_F} \le 100 \quad (2)$$

Direct measurements of the amplitude and phase of Z are obtained by comparing the voltage V from the signal generator and the detected current, as represented by voltage signal $V_I$. These direct measurements are then used to calculate $R_F$. For example, a fully integrated RF IC for measuring amplitude and the phase between two independent input signals can be used to compare voltage V and $V_I$. In this example, the $Z_C$ is dominant so that the observed phase is close to 90°. As a result, the resolutions for both amplitude and phase have to be very high to achieve accurate estimation of formation resistivity, $R_F$ using this technique. A method for direct measurement is desired that does not have such a high resolution requirement in order to achieve accurate estimation of formation resistivity, $R_F$.

SUMMARY OF THE INVENTION

In a first set of examples of the present invention, a method and system are disclosed for measuring formation resisitivity, the method includes the steps of: introducing a electrical signal into a formation; sensing the current of the introduced electrical signal, whereby an analog formation measured signal is produced; comparing the introduced electrical signal with the formation measured signal in a quadrature demodulation device, whereby an in-phase demodulated signal is produced; and extracting a low frequency portion from the in-phase demodulated signal, whereby an analog measurement related to formation resistivity is produced.

In another example, the method further includes the step of converting the analog measurement related to formation resistivity into a digital measurement.

In another example, the electrical signal is introduced in bursts, whereby overall power dissipation is reduced.

In another example, the electrical signal is a square wave signal.

In another example, the step of comparing includes the step of demodulating using Hadamard coherent demodulation.

In another example, the step of comparing includes the step of demodulating using pulse position demodulation.

In another example, the step of comparing includes the step of demodulating using maximum length signal demodulation.

In another example, the method includes the step of comparing the introduced electrical signal with the formation measured signal in a quadrature demodulation device, whereby a quadrature component of the introduced signal indicating standoff situation is produced.

In a second set of examples of the present invention, a system is disclosed for measuring formation resisitivity, the system including: a signal generator having an output for providing a current; a first electrode connected to the output of the signal generator; a current sensing device having an input connected to the first electrode and having an output; a second electrode separated from the first electrode and connected to a ground of the signal generator and connected to a ground of the current sensing device; a quadrature demodulation device having a first input and a second input and an in-phase output, the first input connected to the output of the current sensor and the second input connected to the output of the signal generator; and a low pass filter having an input connected to the in-phase output of the quadrature demodulation device and having an output, whereby an analog measurement related to formation resistivity is produced.

In another example, the system includes an analog-to-digital converter having an analog input connected to the output of the low pass filter and having a digital output, whereby a digital measurement related to formation resistivity is produced.

In another example, the quadrature demodulation device of the system includes a quadrature output, whereby an analog measurement indicating standoff situation is produced.

BRIEF DESCRIPTION OF THE DRAWINGS

The present invention is best understood with reference to the attached drawings in which like numerals refer to like elements, and in which.

DETAILED DESCRIPTION OF THE INVENTION

Figure 2:
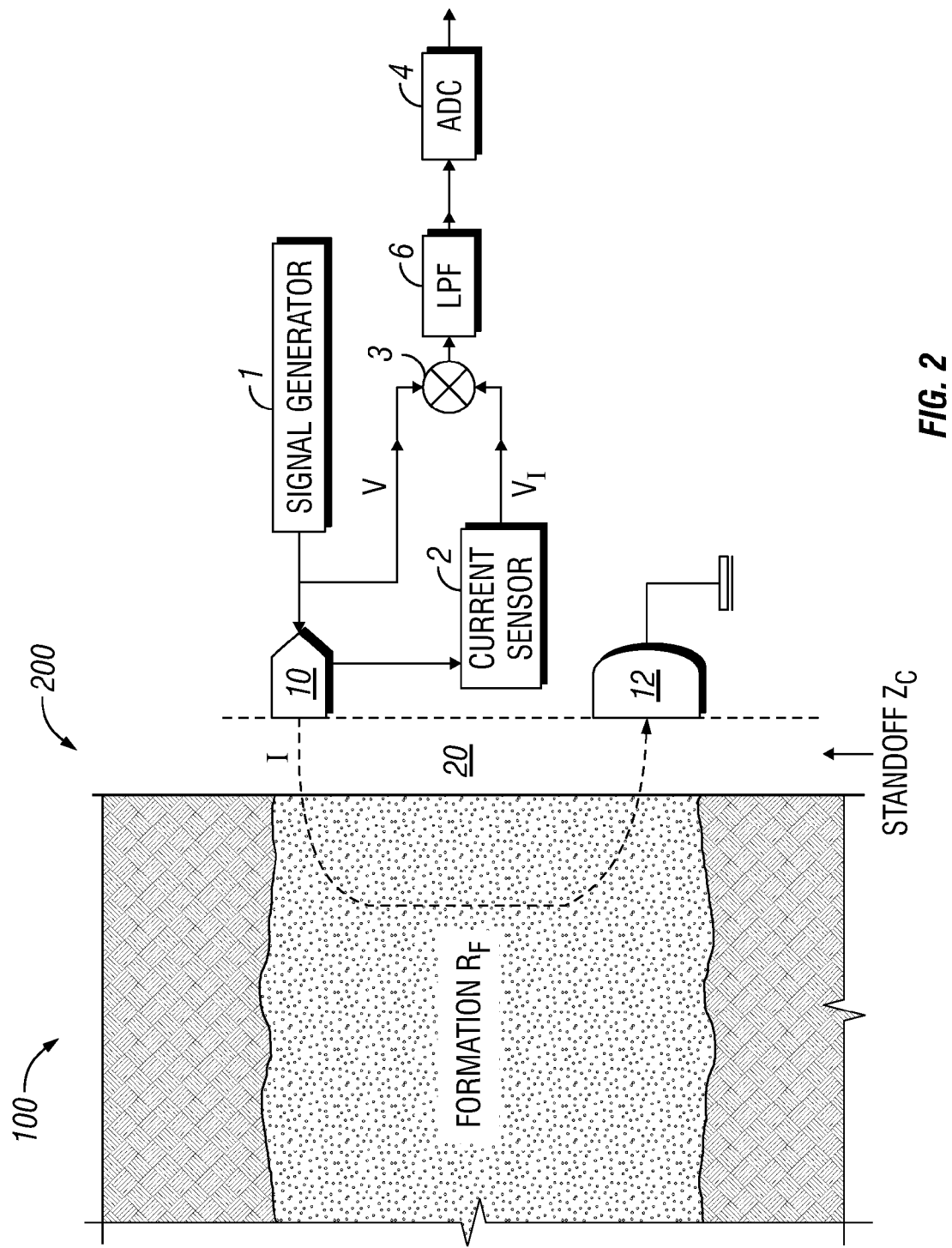
FIG. 2 illustrates a conceptual diagram of a method and system for determination of formation resistivity using coherent analog in-phase demodulation.

FIG. 2 illustrates a conceptual diagram of a method and system for determination of formation resistivity using coherent analog in-phase demodulation. Instead of using direct impedance measurement, a coherent analog in-phase demodulation is used to detect the $R_F$. In this example, a current I is generated by signal generator 1 and introduced into the formation through electrode 10. Electrode 12 is a ground return. Current I penetrates through standoff zone 20 into formation 100. Standoff zone 20 exhibits a standoff impedance $Z_C$, owing to the electrical characteristics of the drilling fluids. Current sensor 2 detects the current at electrode 10, producing voltage signal $V_I$. Integrated Circuit 3 receives the detected current, as represented by voltage signal $V_I$. Integrated circuit 3, for example, is a dual-phase shifter and in-phase/quadrature (I/Q) demodulator that enables coherent summing and phase alignment of multiple analog data channels. An AD8333 (manufactured by Analog Devices, Inc.) is an example of such an integrated circuit. Integrated circuit 3 also receives voltage V from signal generator 1, which is also referred to as a base signal or a coherent reference, enabling comparison of voltage signal $V_I$ with voltage V from signal generator 1. Voltage V from signal generator 1 therefore acts as a coherent reference to voltage signal $V_I$. Both Voltage V and voltage signal $V_I$ are analog signals. Integrated circuit 3 acts as a quadrature demodulation device and is used for in-phase demodulation which rejects the quadrature component. The quadrature component, or common mode signal, is mainly caused by the standoff capacitance, Cs. Integrated circuit 3 outputs the in-phase component of the comparison to low pass filter 6. Low pass filter 6 receives the in-phase component from integrated circuit 3 and passes the low frequency portion of the in-phase component as a quasi-DC signal for output to analog-to-digital converter 4. Analog-to-digital converter 4 receives the quasi-DC signal from low pass filter 6 and converts the quasi-DC in-phase signal into a digital value, producing a direct measure of formation resistivity, $R_F$. In one example, the formation resistivity, $R_F$ is digitized in 8 to 10 bits, which provides enough Signal-to-Noise Ratio (SNR) for image quality.

In another example, coherent demodulation is used with a non-sinusoidal signal as the stimulus from a signal generator. This simplifies and improves the efficiency of the driving circuits. In another example, a square wave is used as the source signal. Other examples of source signal and/or demodulation technique include: demodulating using pulse position demodulation (PPM), demodulating using maximum length signal demodulation (MLS), and demodulating using Hadamard coherent demodulation.

In a further example, overall power dissipation is reduced by using a source signal in a burst mode form of operation.

In a further example, the introduced electrical signal is compared with the formation measured signal in the quadrature demodulation device, integrated circuit 3. The quadrature output from integrated circuit 3 is used to indicate the standoff situation.

Figure 3:
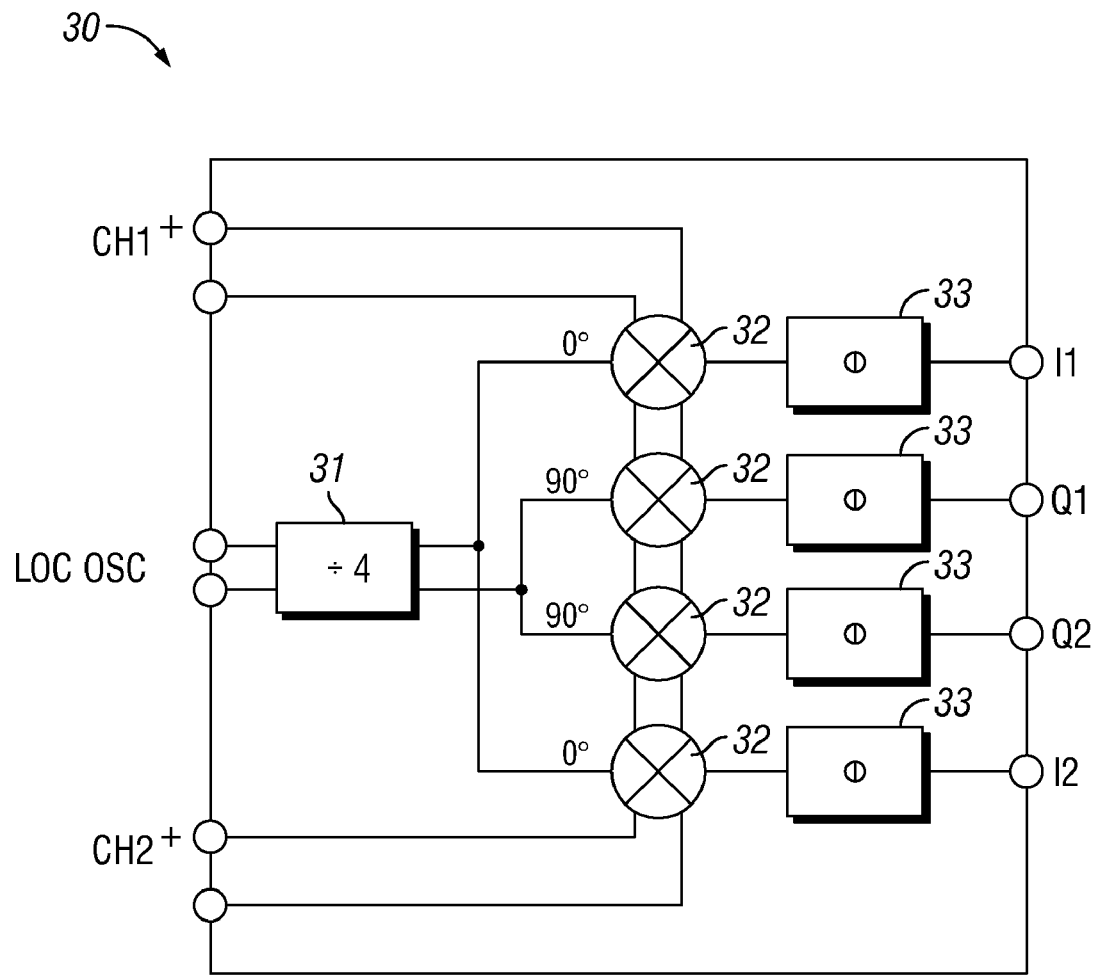
FIG. 3 illustrates a conceptual schematic diagram of an example a quadrature demodulation device.

FIG. 3 illustrates a conceptual schematic diagram of an example of a quadrature demodulation device 30 which can be used for integrated circuit 3 of FIG. 2. An AD8333 (manufactured by Analog Devices, Inc.) is an example of such an integrated circuit. Device 30 has two independent demodulation (DEMOD) channels, CH1 and CH2. The local oscillator port (LOC OSC) allows a voltage measured from the signal generator, such as voltage V of signal generator 1, to be input into device 30. Given input of voltage V through local oscillator port (LOC OSC), the detected current, as represented by voltage signal $V_I$, is input into device 30 through channel port CH1 or CH2 to effect quadrature demodulation. The AD8333 has a frequency divider 31 that divides the frequency of the incoming signal from local oscillator port (LOC OSC) by a factor of four prior to sending the signal to demodulators 32. In examples where the quadrature demodulation device has a built in frequency divider, such as the AD8333, a frequency multiplier (not illustrated) is used to multiply the frequency of the incoming signal prior to input into local oscillator port (LOC OSC). In one example, frequency multiplication is obtained by using another AD8333 configured as a two-stage cascaded frequency multiplier with zero phase shift to multiply the frequency from ω to 4ω. In the AD8333 example, the demodulated signal components from demodulators 32 are sent to phase shifters 33, which are not used in this example, prior to output from the integrated circuit. For signals input through channel port CH1, the in-phase demodulation component is output via in-phase port I1 and quadrature demodulation component is output via quadrature port Q1. For signals input through channel port CH2, the in-phase demodulation component is output via in-phase port I2 and quadrature demodulation component is output via quadrature port Q2.

Figure 1:
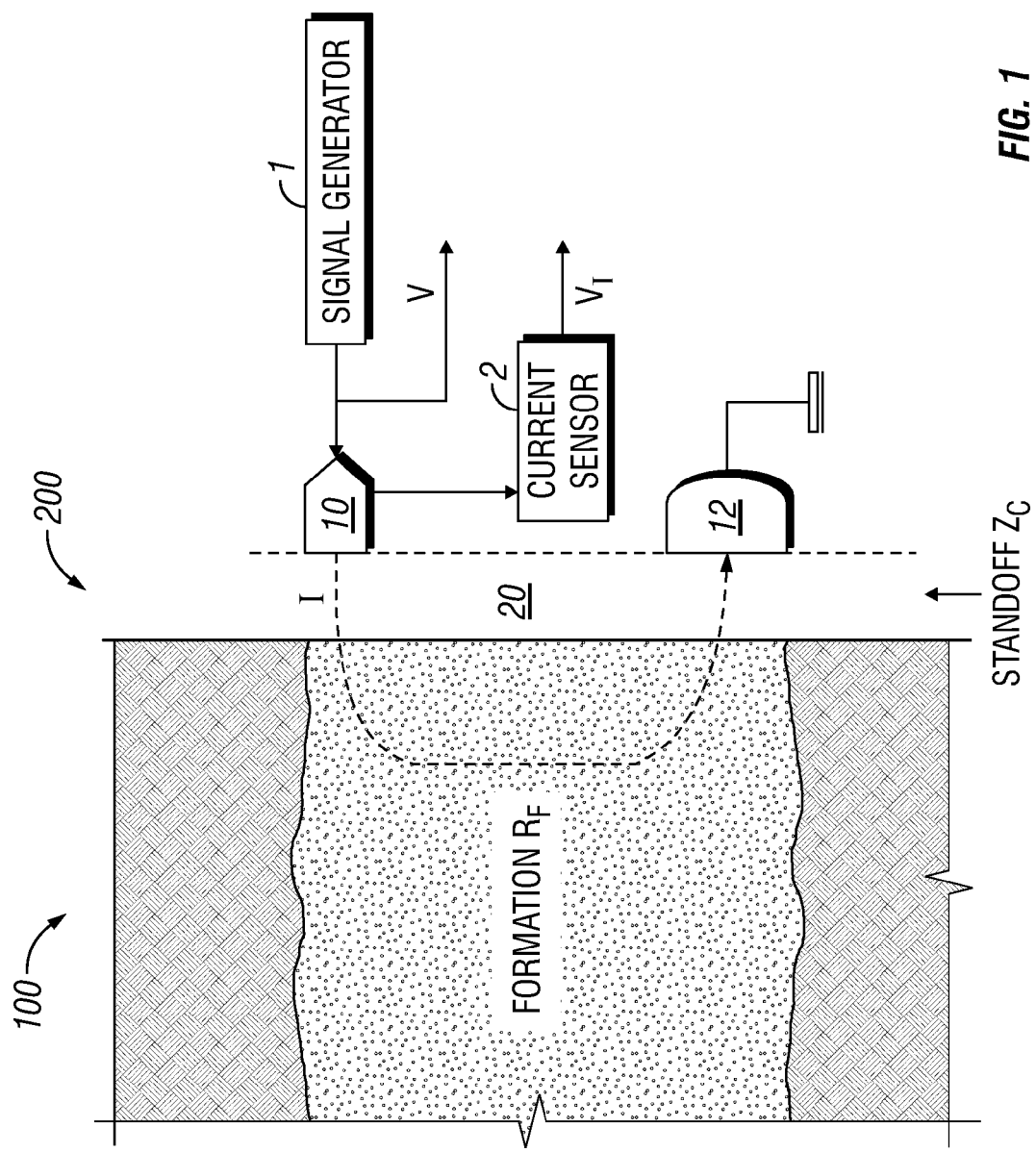
FIG. 1 illustrates a conceptual diagram of a method and system for determination of formation resistivity using direct measurements of amplitude and phase.

In one example, the in-phase base signal, such as voltage V of signal generator 1, is connected to local oscillator port (LOC OSC) while the formation measured signal, voltage signal $V_I$, is connected to channel port CH1 or CH2. In another example, the formation measured signal, voltage signal $V_I$, is connected to local oscillator port (LOC OSC) while the in-phase base signal, such as voltage V of signal generator 1, is connected to channel port CH1 or CH2. In either case, the in-phase component from the comparison of the base signal with the formation measured signal is output through in-phase port I1 or I, respectively. The in-phase component, the output from port I1 or I2, is feed into an analog-to-digital converter (ADC) (for example, analog-to-digital converter 4 of FIG. 2), which is more efficient than the direct impedance measurement shown in FIG. 1. An external low pass filter (LFP) (for example, low pass filter 6 of FIG. 2) is used to extract the quasi-DC in-phase signal.

In another example, frequencies of 20 MHz or greater are introduced into the formation. In another example, frequencies of 100 MHz or greater are introduced into the formation.

It is to be understood that the selection of particular computer system hardware and software is not believed to be of particular relevance to the understanding and practice of the invention, so long as it meets the general criteria just stated. Those of ordinary skill in the art will undoubtedly be aware of numerous computer systems, hardware, associated application software, and/or combinations thereof suitable for the purposes of practicing the invention as disclosed herein.

In at least one example, the processing of the data is accomplished by a downhole processor. In at least one example, the processing of the data is accomplished by a surface processor. Implicit in the control and processing of the data is the use of a computer program implemented on a suitable machine-readable medium that enables the processor to perform the control and processing. The machine-readable medium may include ROMs, EPROMs, EAROMs, flash memories and/or optical disks.

The foregoing disclosure is presented for purposes of illustration and description, and is not intended to limit the invention to the forms disclosed herein. Consequently, variations and modifications commensurate with the above disclosures and the disclosure of the relevant art are within the spirit of the invention. Such variations will readily suggest themselves to those skilled in the relevant art. Further, the examples described are also intended to explain the best mode for carrying out the invention, and to enable others skilled in the art to utilize the invention and such or other embodiments and with various modifications required by the particular applications or uses of the invention. It is intended that the appended claims be construed to include alternative embodiments to the extent that is permitted by prior art.

We claim:

1. A method for measuring formation resistivity, the method comprising the steps of:
    introducing an electrical signal into a formation;
    sensing the current of the introduced electrical signal, whereby an analog formation measured signal is produced;
    comparing the introduced electrical signal with the formation measured signal in a quadrature demodulation device, whereby an in-phase demodulated signal is produced; and
    extracting a low frequency portion from the in-phase demodulated signal, whereby an analog measurement related to formation resistivity is produced.

2. The method of claim 1, further comprising the step of:
    converting said analog measurement related to formation resistivity into a digital measurement.

3. The method of claim 1 wherein said electrical signal is introduced in bursts, whereby overall power dissipation is reduced.

4. The method of claim 1 wherein said electrical signal is a square wave signal.

5. The method of claim 1 wherein said step of comparing comprises the step of demodulating using Hadamard coherent demodulation.

6. The method of claim 1 wherein said step of comparing comprises the step of demodulating using pulse position demodulation.

7. The method of claim 1 wherein said step of comparing comprises the step of demodulating using maximum length signal demodulation.

8. The method of claim 1 further comprising the step of comparing the introduced electrical signal with the formation measured signal in a quadrature demodulation device, whereby a quadrature component of the introduced signal indicating standoff situation is produced.

9. A system for measuring formation resistivity, the system comprising:
    a signal generator having an output for providing a current;
    a first electrode connected to the output of the signal generator;
    a current sensing device having an input connected to the first electrode and having an output;
    a second electrode separated from the first electrode and connected to a ground of the signal generator and connected to a ground of the current sensing device;
    a quadrature demodulation device having a first input and a second input and an in-phase output, the first input connected to the output of the current sensor and the second input connected to the output of the signal generator; and
    a low pass filter having an input connected to the in-phase output of the quadrature demodulation device and having an output, whereby an analog measurement related to formation resistivity is produced.

10. The system of claim 9, further comprising an analog-to-digital converter having an analog input connected to the output of the low pass filter and having a digital output, whereby a digital measurement related to formation resistivity is produced.

11. The system of claim 9 wherein the quadrature demodulation device further comprises a quadrature output, whereby an analog measurement indicating standoff situation is produced.

* * * * *